US010221889B2

(12) United States Patent
Chen et al.

(10) Patent No.: US 10,221,889 B2
(45) Date of Patent: Mar. 5, 2019

(54) SLIDE RAIL ASSEMBLY

(71) Applicants: KING SLIDE WORKS CO., LTD., Kaohsiung (TW); KING SLIDE TECHNOLOGY CO., LTD., Kaohsiung (TW)

(72) Inventors: Ken-Ching Chen, Kaohsiung (TW); Shun-Ho Yang, Kaohsiung (TW); Kai-Wen Yu, Kaohsiung (TW); Chun-Chiang Wang, Kaohsiung (TW)

(73) Assignees: KING SLIDE WORKS CO., LTD., Kaohsiung (TW); KING SLIDE TECHNOLOGY CO., LTD., Kaohsiung (TW)

( * ) Notice: Subject to any disclaimer, the term of this patent is extended or adjusted under 35 U.S.C. 154(b) by 30 days.

(21) Appl. No.: 15/459,002

(22) Filed: Mar. 15, 2017

(65) Prior Publication Data
US 2018/0087572 A1 Mar. 29, 2018

(30) Foreign Application Priority Data

Sep. 24, 2016 (TW) .............................. 105131172 A

(51) Int. Cl.
*A47B 88/493* (2017.01)
*F16C 29/04* (2006.01)
*F16C 29/00* (2006.01)
*F16C 35/02* (2006.01)
*A47B 88/497* (2017.01)

(52) U.S. Cl.
CPC ............ *F16C 29/04* (2013.01); *A47B 88/493* (2017.01); *A47B 88/497* (2017.01); *F16C 29/004* (2013.01); *F16C 35/02* (2013.01)

(58) Field of Classification Search
CPC ........ F16C 29/004; F16C 29/04; F16C 35/02; A47B 2210/0059; A47B 88/497; A47B 88/493
USPC ................. 312/334.16, 334.36, 334.4, 334.5
See application file for complete search history.

(56) References Cited

U.S. PATENT DOCUMENTS

| 2,606,091 | A | * | 8/1952 | Marion | ................. | A47B 88/483 312/334.16 |
| 2,757,051 | A | * | 7/1956 | Wilmer | ................. | A47B 88/483 312/334.16 |
| 2,759,773 | A | * | 8/1956 | Reitzel | ................. | A47B 88/483 280/149.2 |
| 3,087,771 | A | * | 4/1963 | Pari | ........................ | A47B 88/43 312/332 |
| 4,696,582 | A | * | 9/1987 | Kasten | ................. | A47B 88/493 384/18 |
| 5,895,101 | A | | 4/1999 | Cabrales | | |

(Continued)

FOREIGN PATENT DOCUMENTS

| CA | 2 437 147 A1 | 2/2005 |
| DE | 10 2009 014 894 A1 | 9/2010 |

(Continued)

*Primary Examiner* — Daniel J Troy
*Assistant Examiner* — Timothy M Ayres
(74) *Attorney, Agent, or Firm* — Winston Hsu

(57) ABSTRACT

A slide rail assembly includes a first rail, a second rail, a third rail, a first supporting assembly and a sliding auxiliary assembly. The first supporting assembly is arranged on the first rail for supporting the second rail. The sliding auxiliary assembly is movably mounted on the second rail, and includes a plurality of balls for supporting the third rail.

14 Claims, 6 Drawing Sheets

(56) References Cited

U.S. PATENT DOCUMENTS

| | | | |
|---|---|---|---|
| 6,379,045 B1* | 4/2002 | Cirocco | ............... H05K 7/1489 |
| | | | 312/334.11 |
| 6,820,954 B2 | 11/2004 | Judge | |
| 6,834,923 B2 | 12/2004 | Young | |
| 9,155,386 B2* | 10/2015 | Hashemi | ............... F16C 29/048 |
| 9,247,814 B2 | 2/2016 | Chen | |
| 9,545,153 B2 | 1/2017 | Chen | |
| 9,894,993 B2* | 2/2018 | Chen | ...................... H05K 7/183 |
| 2012/0087604 A1* | 4/2012 | Yu | ........................ H05K 7/1489 |
| | | | 384/18 |
| 2016/0262540 A1 | 9/2016 | Chen | |

FOREIGN PATENT DOCUMENTS

| | | |
|---|---|---|
| FR | 1.210.451 | 3/1960 |
| JP | S46-1173 | 1/1971 |
| JP | S60-154032 U | 10/1985 |
| JP | S62-139341 U | 9/1987 |
| JP | 3191407 U | 6/2014 |
| JP | 3200963 U | 11/2015 |

* cited by examiner

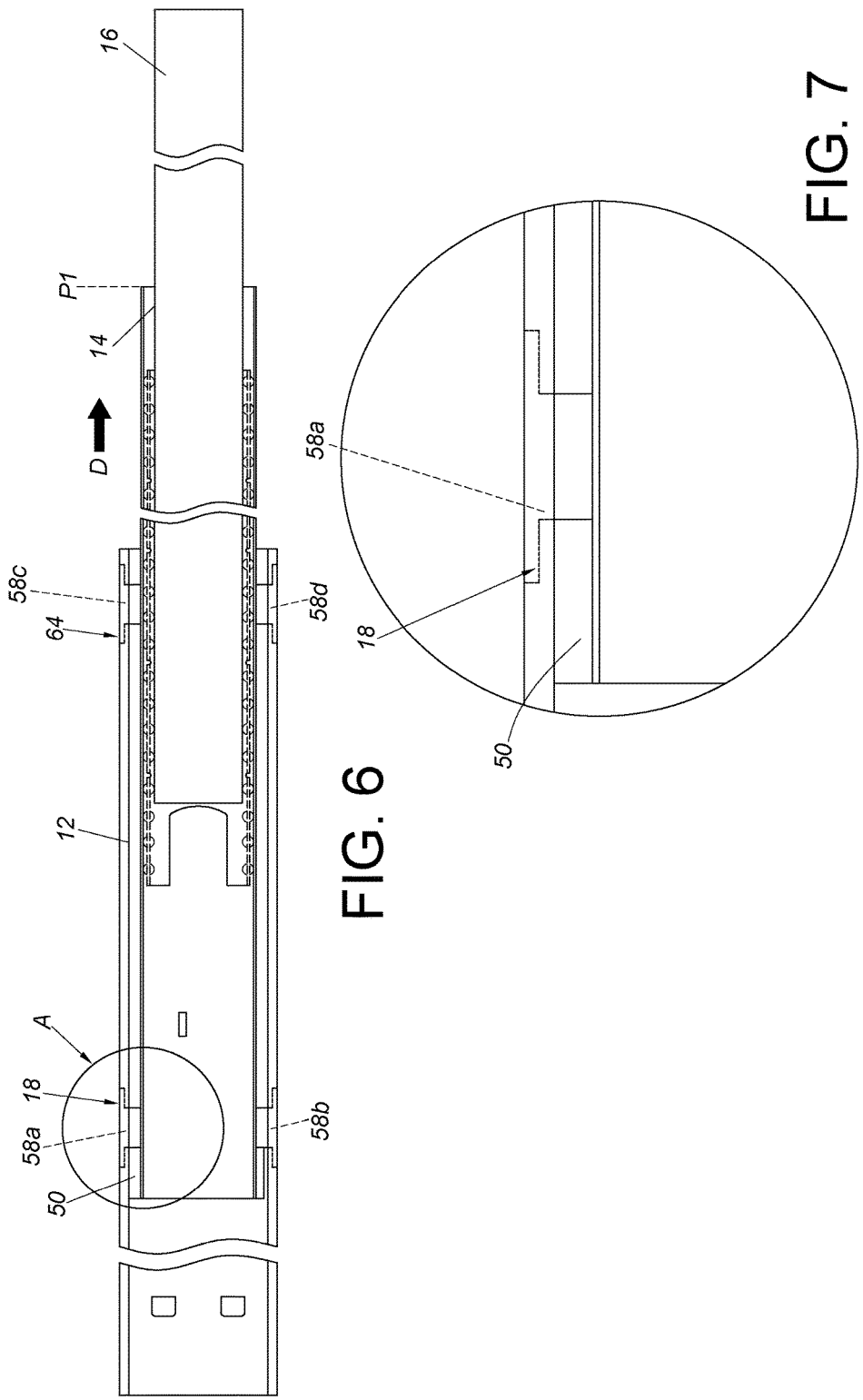

SLIDE RAIL ASSEMBLY

BACKGROUND OF THE INVENTION

1. Field of the Invention

The present invention relates to a slide rail assembly, and more particularly, to a slide rail assembly capable of improving sliding smoothness and supporting stability in a limited space.

2. Description of the Prior Art

Generally, there are two types of slide rail assemblies: a ball bearing slide rail assembly and a solid bearing (friction) slide rail assembly.

U.S. Pat. No. 6,820,954 B2 of by Judge et al. discloses a ball bearing slide rail assembly, which is arranged with a ball bearing to improve sliding smoothness between rails. When the ball bearing slide rail assembly is applied to a rack system for carrying a chassis, the chassis can be easily pulled out of a rack for maintenance or pushed into the rack to retract through the ball bearing slide rail assembly, in order to save space. However, since dimensions of the chassis are getting bigger, the space for installing the ball bearing slide rail assembly is reduced.

U.S. Pat. No. 6,834,923 B2 of by Young et al. discloses a solid bearing slide rail assembly. In contrast to the ball bearing slide rail assembly, the solid bearing slide rail assembly requires a smaller installation space. But due to lack of ball bearing arrangement, sliding smoothness of the solid bearing slide rail is decreased.

Therefore, it is important to develop different slide rail assemblies for meeting specific market requirements.

SUMMARY OF THE INVENTION

The present invention provides a slide rail assembly capable of improving sliding smoothness and supporting stability in a limited space.

According to an embodiment of the present invention, a slide rail assembly comprises a first rail, a second rail, a third rail, a first supporting assembly, and a sliding auxiliary assembly. The first rail comprises a first wall, a second wall and a first side wall extendedly connected between the first wall and the second wall. A first passage is defined by the first wall, the second wall and the first side wall. The second rail is movable relative to the first rail in the first passage. The second rail comprises a third wall, a fourth wall and a second side wall extendedly connected between the third wall and the fourth wall. A second passage is defined by the third wall, the fourth wall and the second side wall. The third wall further comprises a first bending portion, a second bending portion and a third bending portion. The fourth wall comprises a fourth bending portion, a fifth bending portion and a sixth bending portion. Wherein, a first contact surface is formed at an inner side of the first bending portion, and a second contact surface is formed at an outer side of the second bending portion, and an end of the third bending portion extends toward the first bending portion, and a third contact surface is formed at an inner side of the fourth bending portion, and a fourth contact surface is formed at an outer side of the fifth bending portion, and an end of the sixth bending portion extends toward the fourth bending portion. The third rail is movable relative to the second rail in the second passage. The third rail comprises a fifth wall, a sixth wall and a third side wall extendedly connected between the fifth wall and the sixth wall. The fifth wall has a fifth contact surface corresponding to the first contact surface of the second rail. The sixth wall has a sixth contact surface corresponding to the third contact surface of the second rail. The first supporting assembly is arranged at a first longitudinal position on the first rail. The first supporting assembly comprises a first supporting member and a second supporting member fixedly arranged on the first wall and the second wall of the first rail respectively. Wherein, the first supporting member of the first supporting assembly has a first supporting part corresponding to the second contact surface of the second rail, and the second supporting member of the first supporting assembly has a second supporting part corresponding to the fourth contact surface of the second rail. The sliding auxiliary assembly is arranged on the second rail. The sliding auxiliary comprises a plurality of balls configured to assist the third rail in moving relative to the second rail.

Preferably, the first wall of the first rail comprises a first bending part and a second bending part. The first bending part is substantially perpendicularly extended from an upper end of the first side wall. The second bending part is substantially perpendicularly extended from the first bending part. The second wall comprises a third bending part and a fourth bending part. The third bending part is substantially perpendicularly extended from a lower end of the first side wall and corresponds to the first bending part. The fourth bending part is substantially perpendicularly extended from the third bending part and corresponds to the second bending part.

Preferably, the first contact surface, the second contact surface, the third contact surface, the fourth contact surface, the fifth contact surface, and the sixth contact surface are arc-shaped contact surfaces.

Preferably, a first mounting hole and a second mounting hole are respectively arranged on the first wall and the second wall of the first rail, and configured to respectively fix the first supporting member and the second supporting member of the first supporting assembly.

Preferably, the slide rail assembly further comprises a second supporting assembly arranged at a second longitudinal position on the first rail. The second supporting assembly comprises a third supporting member and a fourth supporting member configured to support the second rail.

Preferably, a first width is defined between the third wall of the second rail and the fifth wall of the third rail for allowing the balls of the sliding auxiliary assembly to be in rolling contact with the second rail and the third rail. A second width is defined between the first wall of the first rail and the third wall of the second rail. The second width is smaller than the first width.

According to another embodiment of the present invention, a slide rail assembly comprises a first rail, a second rail, a third rail, a first supporting assembly, a sliding auxiliary assembly, and a stopper. The first rail comprises a first wall, a second wall and a first side wall extendedly connected between the first wall and the second wall. A first passage is defined by the first wall, the second wall and the first side wall. The second rail is movable relative to first rail in the first passage. The second rail comprises a third wall, a fourth wall and a second side wall extendedly connected between the third wall and the fourth wall. A second passage is defined by the third wall, the fourth wall and the second side wall. The third rail is movable relative to the second rail in the second passage. The first supporting assembly is arranged at a first longitudinal position on the first rail. The first supporting assembly comprises a first supporting member and a second supporting member fixedly arranged on the first wall and the second wall of the first rail respectively. The sliding auxiliary assembly is arranged on the second rail. The sliding auxiliary assembly comprises a plurality of balls configured to assist the third rail in moving relative to the second rail. The stopper is fixedly arranged on one of the third wall and the fourth wall of the second rail and located adjacent to a rear end of the second rail. Wherein, when the third rail of the slide rail assembly is pulled from a retracted position relative to the second rail along a direction, the first supporting assembly of the first rail supports the second rail and the sliding assembly supports the third rail. Wherein, when the second rail of the slide rail assembly is pulled along the direction relative to the first rail to a predetermined position, the stopper on the second rail abuts against one of the first supporting member and the second supporting member of the first supporting assembly on the first rail for stopping the second rail at the predetermined position.

Preferably, the first wall of the first rail comprises a first bending part and a second bending part. The first bending part is substantially perpendicularly extended from an upper end of the first side wall. The second bending part is substantially perpendicularly extended from the first bending part. The second wall comprises a third bending part and a fourth bending part. The third bending part is substantially perpendicularly extended from a lower end of the first side wall. The fourth bending part is substantially perpendicularly extended from the third bending part and corresponds to the second bending part.

Preferably, the third wall of the second rail comprises a first bending portion, a second bending portion and a third portion. A first contact surface is formed at an inner side of the first bending portion, and a second contact surface is formed at an outer side of the second bending portion, and an end of the third bending portion extends toward the first bending portion. The fourth wall comprises a fourth bending portion, a fifth bending portion and a sixth bending portion. A third contact surface is formed at an inner side of the fourth bending portion, and a fourth contact surface is formed at an outer side of the fifth bending portion, and an end of the sixth bending portion extends toward the fourth bending portion.

Preferably, the fifth wall of the third rail has a fifth contact surface corresponding to the first contact surface of the second rail, and the sixth wall has a sixth contact surface corresponding to the third contact surface of the second rail.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 6 is a diagram showing a second rail of the slide rail assembly being pulled to move to a predetermined position along the direction according to an embodiment of the present invention.

FIG. 7 is an enlarged view of an area A in FIG. 6.

DETAILED DESCRIPTION

Figure 1:
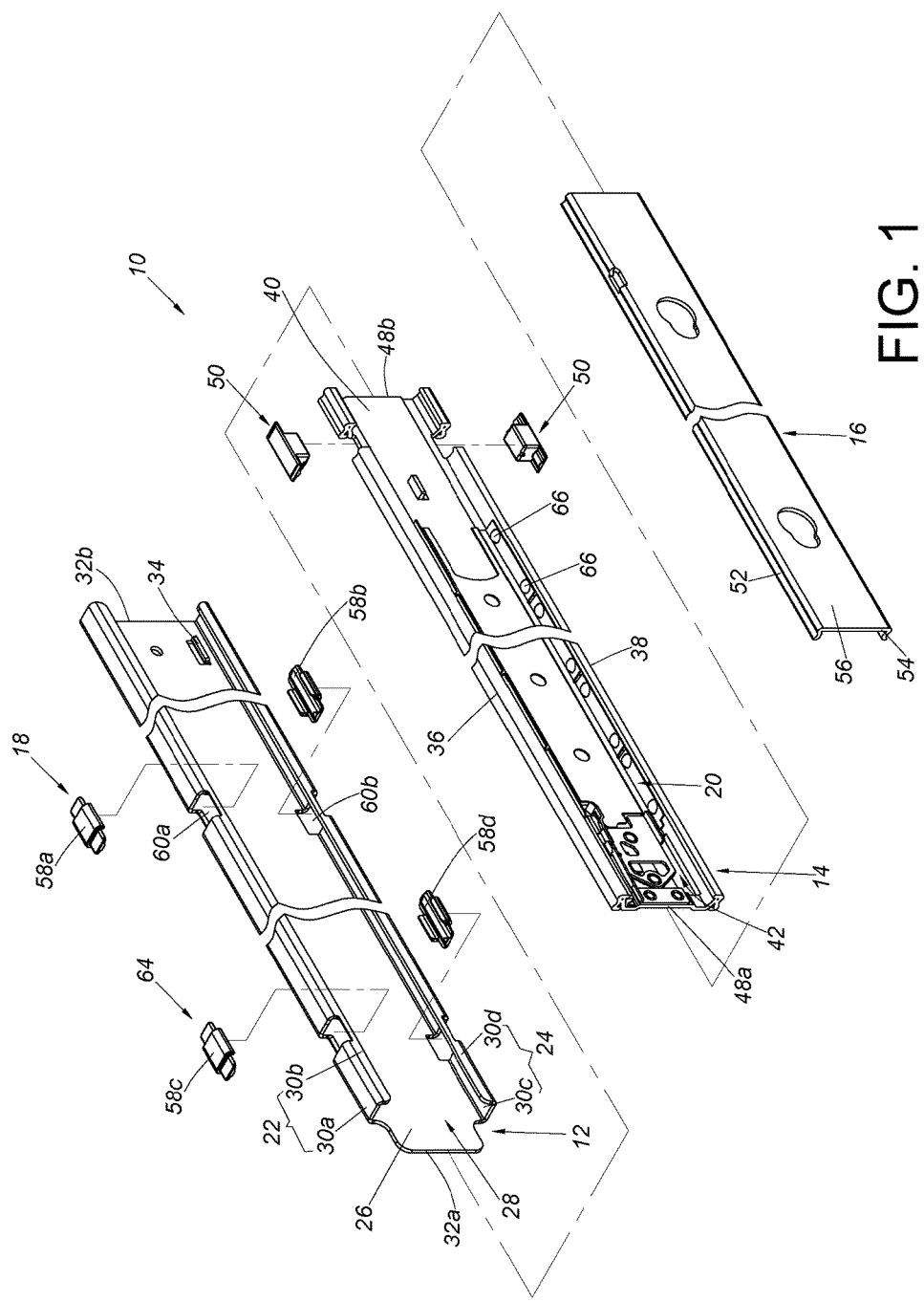
FIG. 1 is an exploded view of a slide rail assembly according to an embodiment of the present invention.
Figure 2:
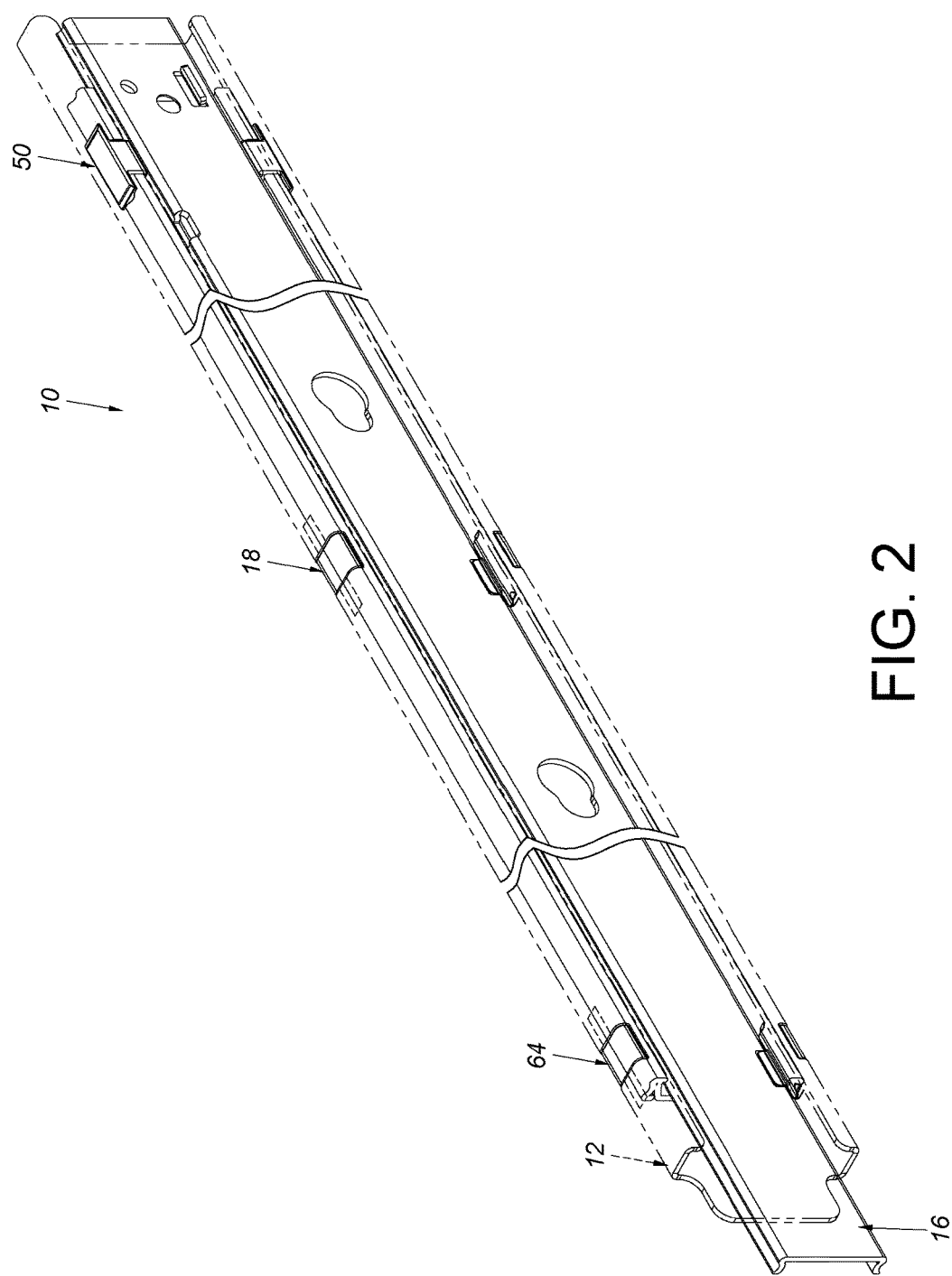
FIG. 2 is a diagram showing the slide rail assembly according to an embodiment of the present invention.
Figure 3:
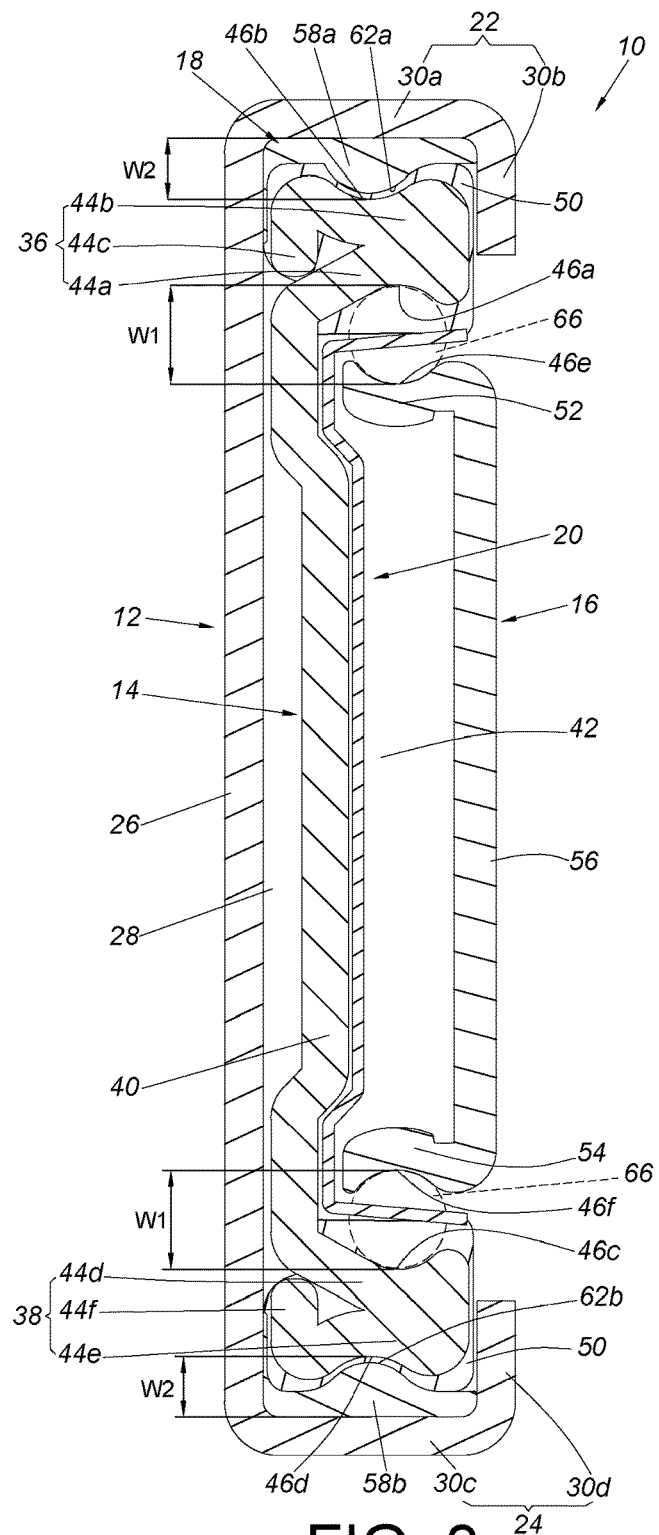
FIG. 3 is a cross-sectional view of the slide rail assembly according to an embodiment of the present invention.

As shown in FIG. 1 to FIG. 3, a slide rail assembly 10 of the present invention comprises a first rail 12, a second rail 14, a third rail 16, a first supporting assembly 18 and a sliding auxiliary assembly 20.

The first rail 12 comprises a first wall 22, a second wall 24 and a first side wall 26 extendedly connected between the first wall 22 and the second wall 24. A first passage 28 is defined by the first wall 22, the second wall 24 and the first side wall 26. The first wall 22 comprises a first bending part 30a and a second bending part 30b. The first bending part 30a is substantially perpendicularly extended from an upper end of the first side wall 26. The second bending part 30b is substantially perpendicularly extended from the first bending part 30a. The second wall 24 comprises a third bending part 30c and a fourth bending part 30d. The third bending part 30c is substantially perpendicularly extended from a lower end of the first side wall 26 and corresponds to the first bending part 30a. The fourth bending part 30d is substantially perpendicularly extended from the third bending part 30c and corresponds to the second bending part 30b. The first side wall 26 has a front end 32a and a rear end 32b. Preferably, the first rail 12 further comprises a stopping part 34 arranged on the first side wall 26 of the first rail 12 and located adjacent to the rear end 32b of the first side wall 26.

The second rail 14 is movable relative to the first rail 12 in the first passage 28. The second rail 14 comprises a third wall 36, a fourth wall 38 and a second side wall 40 extendedly connected between the third wall 36 and the fourth wall 38. A second passage 42 is defined by the third wall 36, the fourth wall 38 and the second side wall 40. The third wall 36 comprises a first bending portion 44a, a second bending portion 44b and a third bending portion 44c. Wherein, a first contact surface 46a is formed at an inner side of the first bending portion 44a, a second contact surface 46b is formed at an outer side of the second bending portion 44b, and an end of the third bending portion 44c extends toward or abuts against the first bending portion 44a. The fourth wall 38 comprises a fourth bending portion 44d, a fifth bending portion 44e and a sixth bending portion 44f. Wherein, a third contact surface 46c is formed at an inner side of the fourth bending portion 44d, a fourth contact surface 46d is formed at an outer side of the fifth bending portion 44e, and an end of the sixth bending portion 44f extends toward or abuts against the fourth bending portion 44d. The second rail 14 has a front end 48a and a rear end 48b. In the present embodiment, the slide rail assembly 10 further comprises two stoppers 50 fixedly arranged on the third wall 36 and the fourth wall 38 of the second rail 14 respectively, and located adjacent to the rear end 48b of the second rail 14.

The third rail 16 is movable relative to the second rail 14 in the second passage 42. The third rail 16 comprises a fifth wall 52, a sixth wall 54 and a third side wall 56 extendedly connected between the fifth wall 52 and the sixth wall 54. The fifth wall 52 has a fifth contact surface 46e corresponding to the first contact surface 46a of the second rail 14. The sixth wall 54 has a sixth contact surface 46f corresponding to the third contact surface 46c of the second rail 14. Preferably, the first contact surface 46a, the second contact surface 46b, the third contact surface 46c, the fourth contact surface 46d, the fifth contact surface 46e, and the sixth contact surface 46f are arc-shaped contact surfaces.

The first supporting assembly 18 is arranged at a first longitudinal position on the first rail 12. Specifically, the first supporting assembly 18 comprises two components having corresponding structures. For example, the first supporting assembly 18 comprises a first supporting member 58a and a second supporting member 58b fixedly arranged on the first wall 22 and the second wall 24 of the first rail 12 respectively. In the present embodiment, at least one first mounting structure is arranged on the first rail 12. For example, a first mounting hole 60a and a second mounting hole 60b are respectively arranged on the first wall 22 and the second wall 24 of the first rail 12, and configured to respectively fix the first supporting member 58a and the second supporting member 58b of the first supporting assembly 18. Wherein, the first supporting member 58a of the first supporting assembly 18 has a first supporting part 62a, which is an arc-shaped protrusion corresponding to the second contact surface 46b of the second rail 14; and the second supporting member 58b of the first supporting assembly 18 has a second supporting part 62b, which is an arc-shaped protrusion corresponding to the fourth contact surface 46d of the second rail 14. Preferably, the slide rail assembly 10 further comprises a second supporting assembly 64 arranged at a second longitudinal position on the first rail 12. The second supporting assembly 64 comprises a third supporting member 58c and a fourth supporting member 58d configured to support the second rail 14. The arrangement of the second supporting assembly 64 is identical to that of the first support member 18. Therefore, no further illustration is provided.

The sliding auxiliary assembly 20 is arranged on the second rail 14. The sliding auxiliary assembly 20 comprises a plurality of balls 66 configured to support the third rail 16, and assist the third rail 16 in moving relative to the second rail 14 for improving smoothness.

In a preferred embodiment, a first width w1 is defined between the third wall 36 of the second rail 14 and the fifth wall 52 of the third rail 16 for allowing the balls 66 of the sliding auxiliary assembly 20 to be in rolling contact with the second rail 14 and the third rail 16. Similarly, a first width w1 is defined between the fourth wall 38 of the second rail 14 and the sixth wall 54 of the third rail 16 for allowing the balls 66 of the sliding auxiliary assembly 20 to be in rolling contact with the second rail 14 and the third rail 16. A second width w2 is defined between the first wall 22 of the first rail 12 and the third wall 36 of the second rail 14. The second width w2 is smaller than the first width w1 and unable to accommodate the aforementioned balls 66. Similarly, a second width w2 is defined between the second wall 24 of the first rail 12 and the fourth wall 38 of the second rail 14. The second width w2 is smaller than the first width w1 and unable to accommodate the aforementioned balls 66. The second width w2 is configured to accommodate the first supporting assembly 18 and the second supporting assembly 64. The first supporting assembly 18 and the second supporting assembly 64 can improve sliding smoothness between the first rail 12 and the second rail 14. Moreover, the first supporting assembly 18 and the second supporting assembly 64 occupy less space than the sliding auxiliary assembly 20 does. Therefore, the slide rail assembly 10 of the present invention can have a smaller volume to be used in a limited space.

Figure 4:
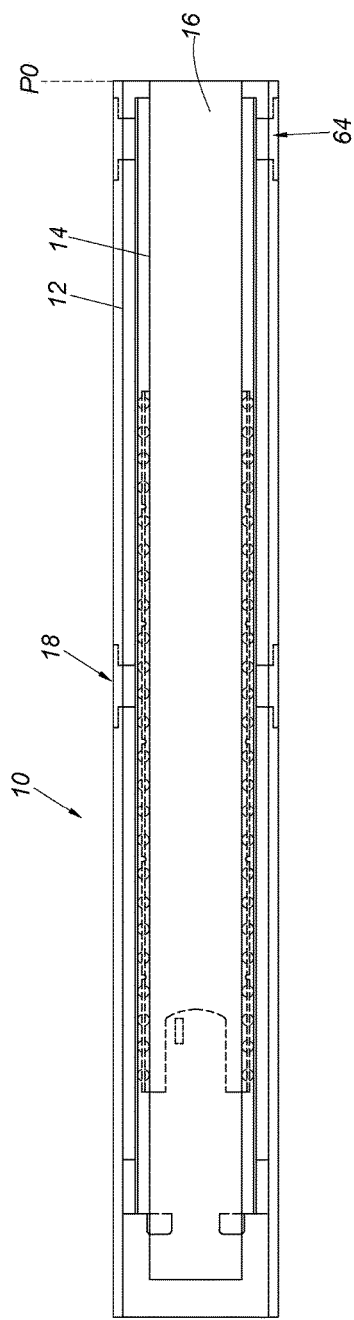
FIG. 4 is a diagram showing the slide rail assembly in a retracted state according to an embodiment of the present invention.
Figure 5:
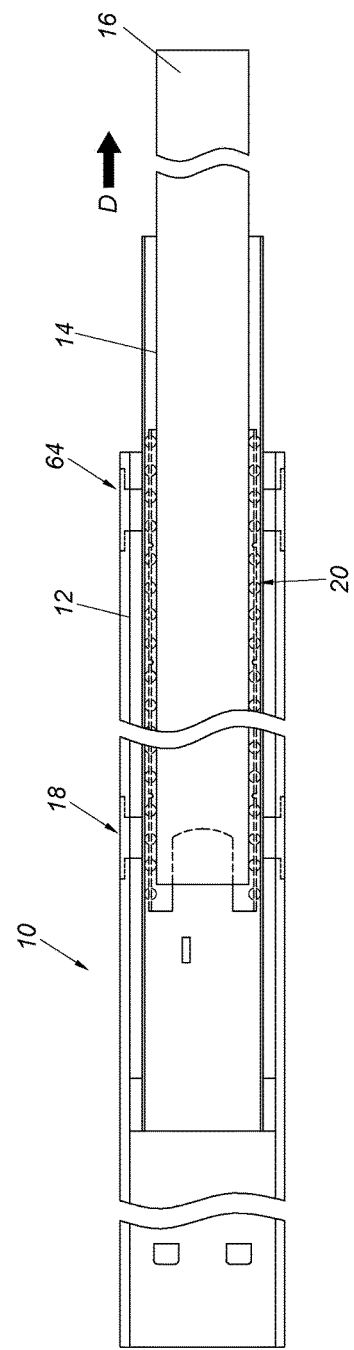
FIG. 5 is a diagram showing rails of the slide rail assembly being pulled to move along a direction according to an embodiment of the present invention.

As shown in FIG. 4 and FIG. 5, when the third rail 16 of the slide rail assembly 10 is pulled out from a retracted position P0 relative to the second rail 14 along a direction D, the first supporting assembly 18 and the second supporting assembly 64 on the first rail 12 are configured to support the second rail 14, and the sliding auxiliary assembly 20 is configured to support the third rail 16. Moreover, the second rail 14 is also pulled out along a direction D.

Figure 8:
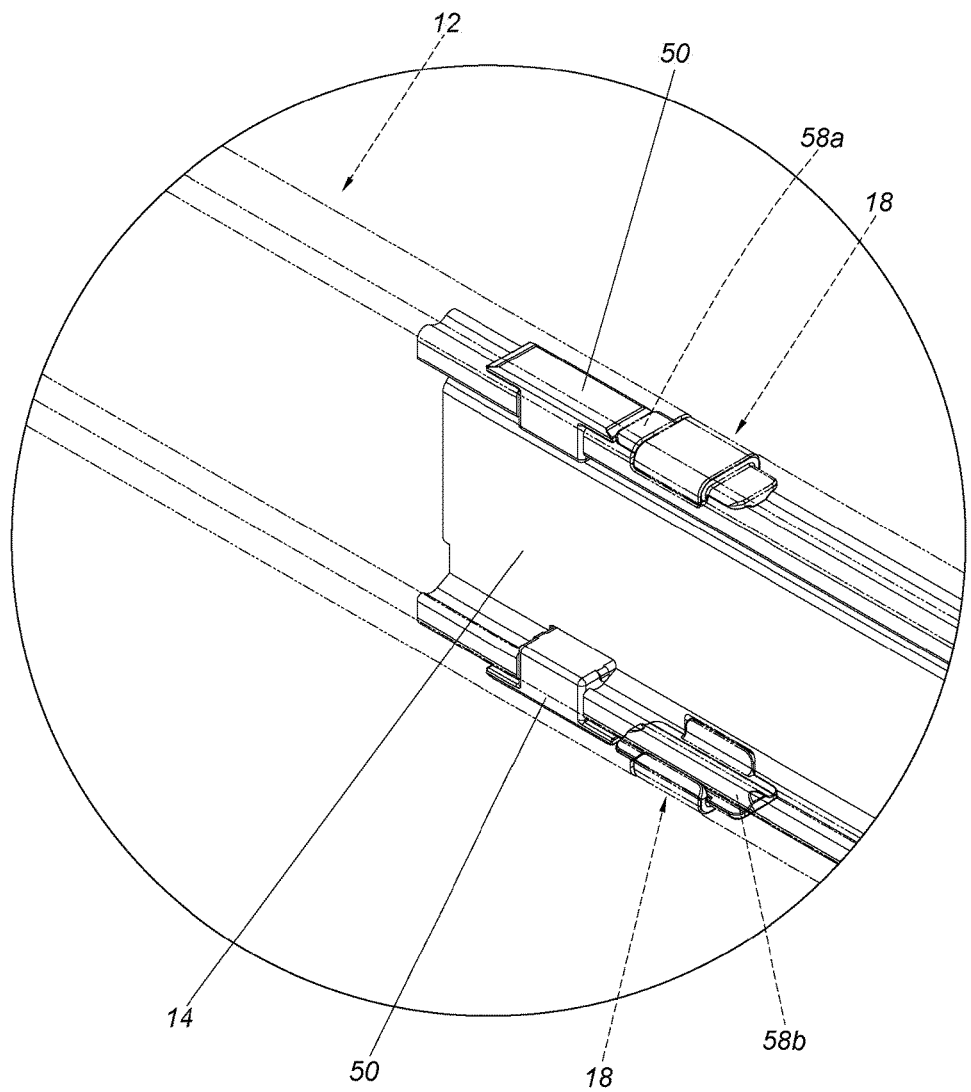
FIG. 8 is a three-dimensional enlarged view of the area A in FIG. 6.

As shown in FIG. 6 to FIG. 8, when the second rail 14 of the slide rail assembly 10 is further pulled to a predetermined position P1 along the direction D relative to the first rail 12, the stopper 50 on the second rail 14 abuts against the first supporting assembly 18 on the first rail 12 for stopping the second rail 14 at the predetermined position P1 and preventing the second rail 14 from being further moved along the direction D relative to the first rail 12.

Therefore, the present invention provides a three-section slide rail assembly to improve sliding smoothness and supporting stability in a limited space through the above arrangement.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A slide rail assembly, comprising:
   a first rail comprising a first wall, a second wall and a first side wall extendedly connected between the first wall and the second wall, a first passage being defined by the first wall, the second wall and the first side wall;
   a second rail movable relative to the first rail in the first passage, the second rail comprising a third wall, a fourth wall and a second side wall extendedly connected between the third wall and the fourth wall, a second passage being defined by the third wall, the fourth wall and the second side wall, the third wall further comprising a first bending portion, a second bending portion and a third bending portion, the fourth wall comprising a fourth bending portion, a fifth bending portion and a sixth bending portion, wherein a first contact surface is formed at an inner side of the first bending portion, a second contact surface is formed at an outer side of the second bending portion, an end of the third bending portion extends toward the first bending portion, a third contact surface is formed at an inner side of the fourth bending portion, a fourth contact surface is formed at an outer side of the fifth bending portion, an end of the sixth bending portion extends toward the fourth bending portion;
   a third rail movable relative to the second rail in the second passage, the third rail comprising a fifth wall, a sixth wall and a third side wall extendedly connected between the fifth wall and the sixth wall, the fifth wall having a fifth contact surface corresponding to the first contact surface of the second rail, the sixth wall having a sixth contact surface corresponding to the third contact surface of the second rail;
   a first supporting assembly arranged at a first longitudinal position on the first rail, the first supporting assembly comprising a first supporting member and a second supporting member fixedly arranged on the first wall and the second wall of the first rail respectively, and configured to support the second rail, wherein the first supporting member of the first supporting assembly comprises a first embedding portion and a first supporting part corresponding to the second contact surface of the second rail, the first supporting part is an arc-shaped protrusion, the second supporting member of the first supporting assembly comprises a second supporting part corresponding to the fourth contact surface of the second rail, a first mounting hole is arranged on the first wall of the first rail and configured to fix the first supporting member of the first supporting assembly, the first embedding portion is fitted into the first mounting hole, and an outer surface of the first embedding portion is aligned with an outer surface of the first wall; and a sliding auxiliary assembly arranged on the second rail, the sliding auxiliary assembly comprising a plurality of balls configured to assist the third rail in moving relative to the second rail.

2. The slide rail assembly of claim 1, wherein the first wall of the first rail comprises a first bending part and a second bending part, the first bending part is substantially perpendicularly extended from an upper end of the first side wall, the second bending part is substantially perpendicularly extended from the first bending part, the second wall comprises a third bending part and a fourth bending part, the third bending part is substantially perpendicularly extended from a lower end of the first side wall and corresponds to the first bending part, the fourth bending part is substantially perpendicularly extended from the third bending part and corresponds to the second bending part.

3. The slide rail assembly of claim 1, wherein the first contact surface, the second contact surface, the third contact surface, the fourth contact surface, the fifth contact surface, and the sixth contact surface are arc-shaped contact surfaces.

4. The slide rail assembly of claim 1, wherein the second supporting member of the first supporting assembly further comprises a second embedding portion, a second mounting hole is arranged on the second wall of the first rail and configured to fix the second supporting member of the first supporting assembly, the second embedding portion is fitted into the second mounting hole, and an outer surface of the second embedding portion is aligned with the outer surface of the second wall.

5. The slide rail assembly of claim 1, further comprising a second supporting assembly arranged at a second longitudinal position on the first rail, the second supporting assembly comprising a third supporting member and a fourth supporting member configured to support the second rail.

6. The slide rail assembly of claim 1, wherein a first width is defined between the third wall of the second rail and the fifth wall of the third rail for allowing the balls of the sliding auxiliary assembly to be in rolling contact with the second rail and the third rail, a second width is defined between the first wall of the first rail and the third wall of the second rail, the second width is smaller than the first width.

7. A slide rail assembly, comprising:
a first rail comprising a first wall, a second wall and a first side wall extendedly connected between the first wall and the second wall, a first passage being defined by the first wall, the second wall and the first side wall;
a second rail movable relative to first rail in the first passage, the second rail comprising a third wall, a fourth wall and a second side wall extendedly connected between the third wall and the fourth wall, a second passage being defined by the third wall, the fourth wall and the second side wall;
a third rail movable relative to the second rail in the second passage;

a first supporting assembly arranged at a first longitudinal position on the first rail, the first supporting assembly comprising a first supporting member and a second supporting member fixedly arranged on the first wall and the second wall of the first rail respectively, wherein the first supporting member of the first supporting assembly comprises a first embedding portion and a first supporting part connected to the first embedding portion, the first supporting part is an arc-shaped protrusion, a first mounting hole is arranged on the first wall of the first rail and configured to fix the first supporting member of the first supporting assembly, the first embedding portion is fitted into the first mounting hole, and an outer surface of the first embedding portion is aligned with an outer surface of the first wall;

a sliding auxiliary assembly arranged on the second rail, the sliding auxiliary assembly comprising a plurality of balls configured to assist the third rail in moving relative to the second rail; and a stopper fixedly arranged on one of the third wall and the fourth wall of the second rail and located adjacent to a rear end of the second rail;

wherein when the third rail of the slide rail assembly is pulled from a retracted position relative to the second rail along a direction, the first supporting assembly of the first rail supports the second rail and the sliding auxiliary assembly supports the third rail;

wherein when the second rail of the slide rail assembly is pulled along the direction relative to the first rail to a predetermined position, the stopper on the second rail abuts against one of the first supporting member and the second supporting member of the first supporting assembly on the first rail for stopping the second rail at the predetermined position.

8. The slide rail assembly of claim 7, wherein the first wall of the first rail comprises a first bending part and a second bending part, the first bending part is substantially perpendicularly extended from an upper end of the first side wall, the second bending part is substantially perpendicularly extended from the first bending part, the second wall comprises a third bending part and a fourth bending part, the third bending part is substantially perpendicularly extended from a lower end of the first side wall and corresponds to the first bending part, the fourth bending part is substantially perpendicularly extended from the third bending part and corresponds to the second bending part.

9. The slide rail assembly of claim 7, wherein the third wall of the second rail comprises a first bending portion, a second bending portion and a third bending portion, a first contact surface is formed at an inner side of the first bending portion, a second contact surface is formed at an outer side of the second bending portion, an end of the third bending portion extends toward the first bending portion, the fourth wall comprises a fourth bending portion, a fifth bending portion and a sixth bending portion, a third contact surface is formed at an inner side of the fourth bending portion, a fourth contact surface is formed at an outer side of the fifth bending portion, an end of the sixth bending portion extends toward the fourth bending portion.

10. The slide rail assembly of claim 9, wherein the fifth wall of the third rail has a fifth contact surface corresponding to the first contact surface of the second rail, the sixth wall has a sixth contact surface corresponding to the third contact surface of the second rail.

11. The slide rail assembly of claim 10, wherein the first contact surface, the second contact surface, the third contact surface, the fourth contact surface, the fifth contact surface, and the sixth contact surface are arc-shaped contact surfaces.

12. The slide rail assembly of claim 7, wherein the second supporting member of the first supporting assembly comprises a second embedding portion, a second mounting hole is arranged on the second wall of the first rail and configured to fix the second supporting member of the first supporting assembly, the second embedding portion is fitted into the second mounting hole, and an outer surface of the second embedding portion is aligned with an outer surface of the second wall.

13. The slide rail assembly of claim 7, further comprising a second supporting assembly arranged at a second longitudinal position on the first rail, the second supporting assembly comprising a third supporting member and a fourth supporting member configured to support the second rail.

14. The slide rail assembly of claim 7, wherein a first width is defined between the third wall of the second rail and the fifth wall of the third rail for allowing the balls of the sliding auxiliary assembly to be in rolling contact with the second rail and the third rail, a second width is defined between the first wall of the first rail and the third wall of the second rail, the second width is smaller than the first width.

\* \* \* \* \*